US007623112B2

(12) United States Patent
Chen et al.

(10) Patent No.: US 7,623,112 B2
(45) Date of Patent: Nov. 24, 2009

(54) IMAGE SENSOR ARRAY AND LIQUID CRYSTAL DISPLAY WITH SENSOR ELEMENTS

(75) Inventors: Po-Yeng Chen, Tao-Yuan Hsien (TW); Po-Sheng Shih, Tao-Yuan Hsien (TW)

(73) Assignee: Hannstar Display Corp., Tao-Yuan Hsien (TW)

( * ) Notice: Subject to any disclaimer, the term of this patent is extended or adjusted under 35 U.S.C. 154(b) by 622 days.

(21) Appl. No.: 11/424,025

(22) Filed: Jun. 14, 2006

(65) Prior Publication Data

US 2007/0290963 A1 Dec. 20, 2007

(51) Int. Cl.
*G09G 3/36* (2006.01)
*G02F 1/133* (2006.01)

(52) U.S. Cl. ....................... 345/104; 345/173; 345/174; 345/175; 345/176; 345/177; 345/178; 348/294; 178/18.01; 178/18.11; 257/59; 257/72

(58) Field of Classification Search .................. 345/82, 345/87, 38, 50, 349, 104, 173–178; 348/294; 257/59–72; 178/18.01–18.11
See application file for complete search history.

(56) References Cited

U.S. PATENT DOCUMENTS 5,638,121 A * 6/1997 Hosier et al. ................ 348/312
6,947,102 B2 * 9/2005 den Boer et al. .............. 349/12
2002/0070905 A1 * 6/2002 Kodate et al. ................. 345/55
2002/0084960 A1 * 7/2002 Song et al. ..................... 345/87
2003/0063706 A1 * 4/2003 Ikeda et al. ................ 378/98.8
2004/0008172 A1 * 1/2004 Nakamura et al. ............ 345/89
2004/0046900 A1 * 3/2004 Boer et al. ..................... 349/43
2007/0109239 A1 * 5/2007 den Boer et al. .............. 345/87

* cited by examiner

*Primary Examiner*—Richard Hjerpe
*Assistant Examiner*—Olga Merkoulova
(74) *Attorney, Agent, or Firm*—Volpe and Koenig PC

(57) ABSTRACT

The present invention provides an image sensor array and a liquid crystal display for increasing the readout time thereof. The image sensor array and liquid crystal display both comprise a substrate, a readout line disposed on the substrate, a first switch line and a second switch line both intersecting the readout line, a first position defined by the readout line and the first switch line, a second position defined by the readout line and the second switch line, and a sensor element disposed on the first position and separated from the second position, wherein the first switch line transmitting a first switch signal and the second switch line transmitting a second switch signal overlapped the first switch signal.

20 Claims, 12 Drawing Sheets

IMAGE SENSOR ARRAY AND LIQUID CRYSTAL DISPLAY WITH SENSOR ELEMENTS

FIELD OF THE INVENTION

The present invention relates to an image sensor array with photosensing devices and the driving method thereof, and more particularly to an a-Si TFT-LCD.

BACKGROUND OF THE INVENTION

An a-Si TFT sensor array is operated with the photosensitive characteristic of the amorphous silicon thin film transistors. There exist two kinds of the a-Si TFT sensor arrays: a charge-type sensor array and a current-type sensor array.

Please refer to FIG. 1, which is a circuit diagram showing a sensor element of a charge-type sensor array according to the prior art. The sensor element 1 includes a photosensing device 10, a storage capacitor 11 and a readout switch device 12. The photosensing device 10 generates a photocurrent in response to received light. The gate electrode 101 and the source electrode 103 of the photosensing device 10 are both coupled to a bias voltage 13 which is usually connected to common voltage. The source and drain electrodes 103, 102 of the photosensing device 10 are also coupled to the storage capacitor 11 which is discharged when the photosensing device 10 is exposed to light. The storage capacitor 11 is coupled to the source electrode 121 of the readout switch device 12, too. The charge on the storage capacitor 11 is read out periodically through the readout switch device 12 and a readout line 14. As shown, the gate electrode 122 of the readout switch device 12 is coupled to a switch line 15 to enable the readout switch device 12 switching. The drain electrode 123 of the readout switch device 12 is coupled to the readout line 14 to readout the charge.

Please refer to FIG. 2, which is a circuit diagram showing a sensor element of a current-type sensor array according to the prior art. The sensor element 2 includes a photosensing device 20 and a readout switch device 22. The drain electrode and the gate electrode of the photosensing device 20 are coupled to a bias voltage 23. Besides, the drain electrode of the readout switch device 22 is coupled to the source electrode of the photosensing device 20 and the source electrode of the readout switch device 22 is coupled to a readout line 24. The gate electrode of the readout switch device 22 is coupled to a switch line 25. Accordingly, the current of the photosensing device 20 is read out periodically through the readout line 24.

Since the compatibility with the manufacturing process of an LCD, the sensor element 1 or 2 can also be embedded in TFT-LCD as an input display for detecting light. Please refer to FIG. 3, which is a partial cross-sectional view showing a TFT-LCD embedded by sensor elements according to the prior art. As shown, the TFT-LCD 3 includes two substrates 30, 31, a liquid crystal layer 37, a color filter 32, a black matrix 33, readout switch devices 35 and photosensing devices 36. The photosensing devices 36 receive light passing through openings 34 and operate as the aforementioned descriptions.

Next, a current-type sensor array is taken for example to explain its operation principles. Please refer to FIG. 4, which is a partial circuit diagram showing a current-type sensor array 4 according to the prior art. The sensor array 4 includes m sensor elements 2 in each row and n sensor elements 2 in each column. Besides, there are m readout lines $RO_{1-m}$ and n switch lines $SW_{1-n}$ coupled to these sensor elements. The switch lines $SW_{1-n}$ are turned on one by one to reach the location in Y-direction and then the photocurrent is read out to reach the location in X-direction, so the two dimensional detection is accomplished.

Please refer to FIG. 5, which is a timing diagram showing the operation of the sensor array in FIG. 4. As shown, a photocurrent occurs on the readout line $RO_1$ when the switch line $SW_1$ is turned on, then the photocurrent is read out during the selection signal $SL_1$ turned on. In other words, each selection signal corresponds to its corresponded readout line, for instance, the selection signal $SL_2$ corresponds to the readout line $RO_2$ and the selection signal $SL_m$ corresponds to the readout line $RO_m$. It is noticed that a sudden high photocurrent appears in a short transient time a when the switch line $SW_1$ begins to be turned on, so the unstable photocurrent is not read out from the readout line $RO_1$. After the transient time α, the photocurrent becomes stable for being able to read out form the readout line $RO_1$, and the period used to be read out the stable photocurrent is called readout time β.

The transient state of the photocurrent is caused by RC delay of the sensor element circuit itself and deep trap of the amorphous silicon. Please refer to FIG. 6, which is a timing diagram showing the variation of different photocurrent signals of FIG. 5. In FIG. 6, different photocurrent signal curves represent ones due to the different amounts of the received light. In other words, when the sensor element detects or receives a light which the unit of the light strength is lux, a photocurrent $I_{photo}$ occurs in the sensor element. Unfortunately, the photocurrent $I_{photo}$ is not always stable, and the amount of the photocurrent is a function of time.

As shown, a peak of the photocurrent signal appears in the transient time and then declines to a steady state. In the steady state, the photocurrent signal is readable. However, the transient time and the readout time are both affected by resolution. If the resolution is increased, the readout time will be reduced and the transient time will be raised. That means there may be no efficient time to read out the photocurrent. According to that, the resolution is limited, or the readout time cannot be easily extended.

SUMMARY OF THE INVENTION

It is therefore an object of the present invention to provide an image sensor array and a liquid crystal display with sensor elements disposed in a specific configuration, so that the readout time of the image sensor array is increased.

According to the object of the present invention, an image sensor array is provided. The image sensor array comprises a substrate, a readout line disposed on the substrate, a first switch line and a second switch line both intersecting the readout line, a first position defined by the readout line and the first switch line, a second position defined by the readout line and the second switch line, and a sensor element disposed only on the first position, wherein the first switch line transmitting a first switch signal and the second switch line transmitting a second switch signal overlapped the first switch signal.

Preferably, the present invention provides the image sensor array, wherein the sensor element comprises a readout switch device and a photosensing device connecting to a bias voltage.

Preferably, the present invention provides the image sensor array, wherein the readout switch device comprises a first gate electrode, a first drain electrode, and a first source electrode.

Preferably, the present invention provides the image sensor array, wherein the first gate electrode connects to the first switch line.

Preferably, the present invention provides the image sensor array, wherein the first drain electrode connects to the readout line, and the first source electrode connects to the photosensing device and a storage capacitor connecting to the bias voltage.

Preferably, the present invention provides the image sensor array, wherein the first drain electrode connects to photosensing device, and the first source electrode connects to the readout line.

Preferably, the present invention provides the image sensor array, wherein the photosensing device comprises a second gate electrode, a second drain electrode, and a second source electrode.

Preferably, the present invention provides the image sensor array, wherein the second gate electrode connects to a storage capacitor and the bias voltage, the second drain electrode connects to the readout switch device and the storage capacitor, and the second source electrode connects to the storage capacitor and the bias voltage.

Preferably, the present invention provides the image sensor array, wherein the second gate electrode connects to the bias voltage, the second drain electrode connects to the bias voltage, and the second source electrode connects to the readout switch device.

According to the object of the present invention, a liquid crystal display is provided. The liquid crystal display comprises a first substrate and a second substrate, a liquid crystal layer interlaid between the first substrate and the second substrate, a readout line and a data line both disposed on the first substrate, a first switch line and a second switch line both intersecting the readout line and the data line, a first position defined by the readout line and the first switch line, a second position defined by the readout line and the second switch line, and a sensor element disposed only on the first position, wherein the first switch line transmitting a first switch signal and the second switch line transmitting a second switch signal overlapped the first switch signal.

Preferably, the present invention provides the liquid crystal display, wherein the sensor element comprises a readout switch device, a photosensing device, and a pixel switch device.

Preferably, the present invention provides the liquid crystal display, wherein the readout switch device comprises a first gate electrode, a first drain electrode, and a first source electrode.

Preferably, the present invention provides the liquid crystal display, wherein the first gate electrode connects to the first switch line.

Preferably, the present invention provides the liquid crystal display, wherein the first drain electrode connects to the readout line, and the first source electrode connects to the photosensing device and a storage capacitor connecting to the bias voltage.

Preferably, the present invention provides the liquid crystal display, wherein the first drain electrode connects to photosensing device, and the first source electrode connects to the readout line.

Preferably, the present invention provides the liquid crystal display, wherein the photosensing device comprises a second gate electrode, a second drain electrode, and a second source electrode.

Preferably, the present invention provides the liquid crystal display, wherein the second gate electrode connects to a storage capacitor and the bias voltage, the second drain electrode connects to the readout switch device and the storage capacitor, and the second source electrode connects to the storage capacitor and the bias voltage.

Preferably, the present invention provides the liquid crystal display, wherein the second gate electrode connects to the bias voltage, the second drain electrode connects to the bias voltage, and the second source electrode connects to the readout switch device.

Preferably, the present invention provides the liquid crystal display, wherein the pixel switch device comprises a third gate electrode connecting to one of the first switch line and the second switch line, a third drain electrode connects to a liquid capacitor and a storage capacitor, and a third source electrode connects to the data line.

Preferably, the present invention provides the liquid crystal display, wherein the liquid capacitor and the storage capacitor both connect to a common voltage.

The foregoing and other features and advantages of the present invention will be more clearly understood through the following descriptions with reference to the drawings, wherein:

BRIEF DESCRIPTION OF THE DRAWINGS

FIG. 7 (B) is a partial circuit diagram showing another image sensor array according to the present invention;

FIG. 10 (B) is a partial waveform diagram showing a gate signal of the readout pixel with the image sensor array technology according to the present invention.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
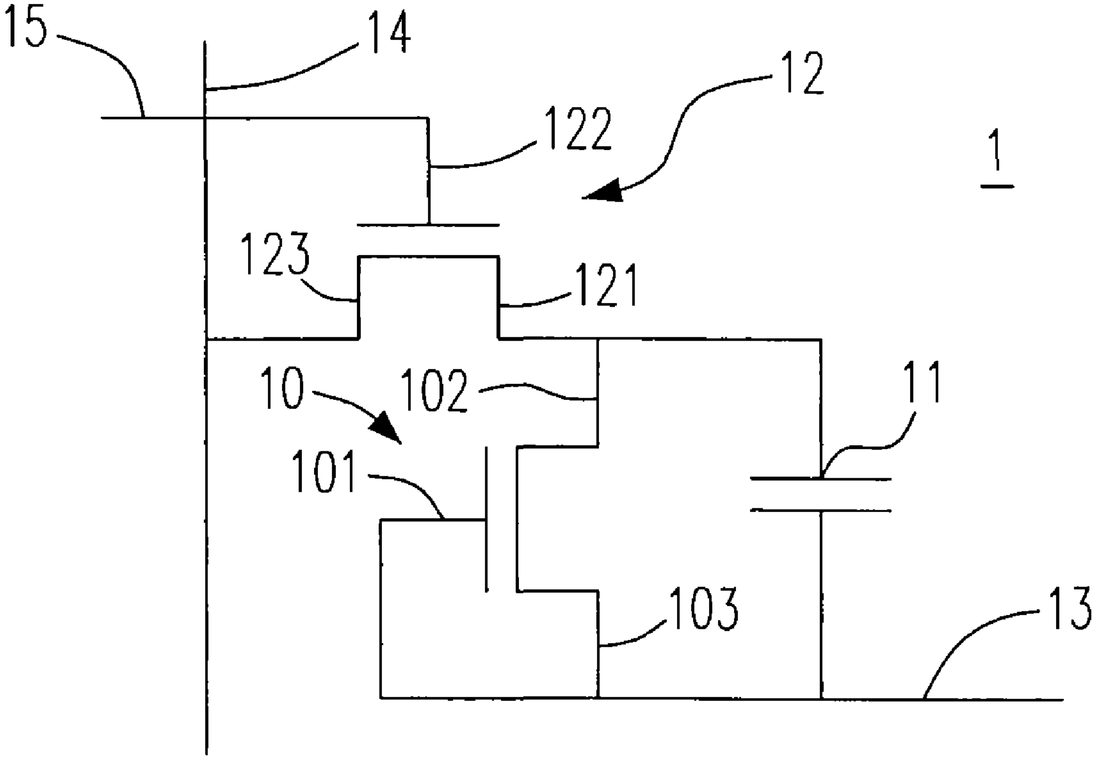
Fig. 1 (PRIOR ART)
FIG. 1 is a circuit diagram showing a sensor element of a charge-type sensor array according to the prior art.
Figure 2:
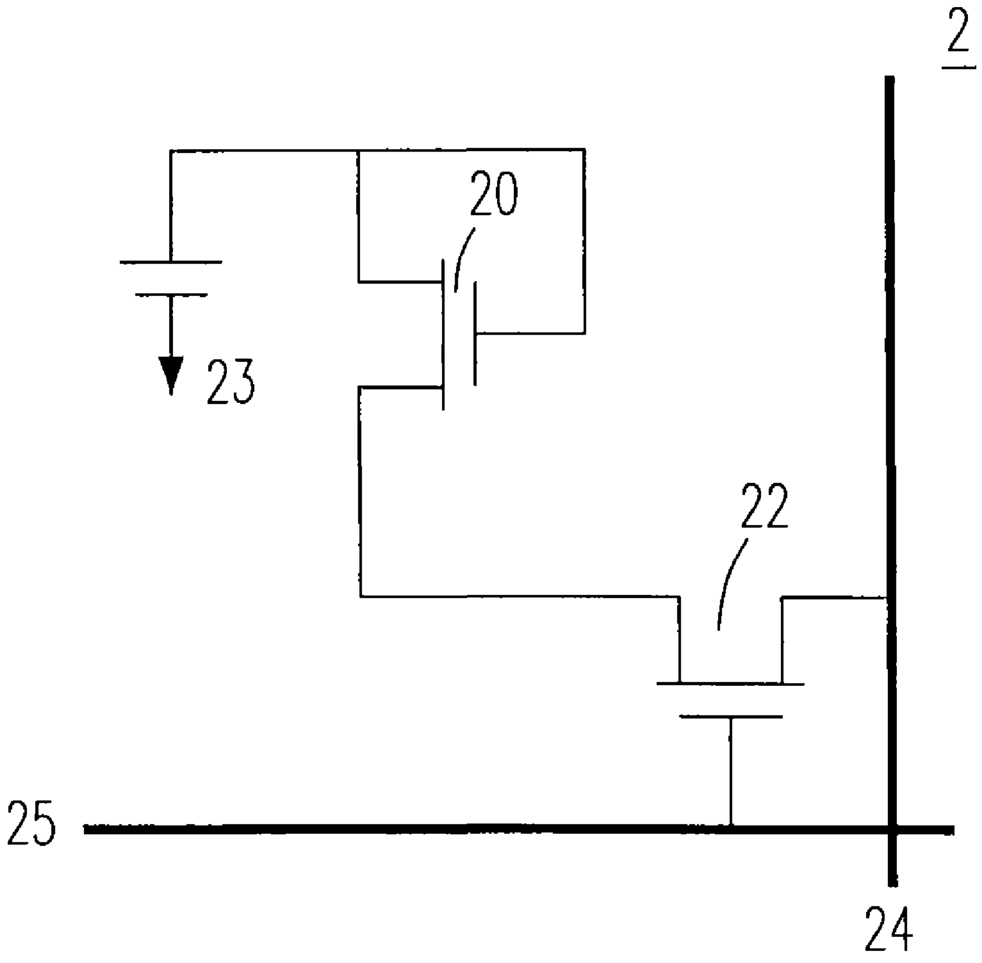
Fig. 2 (PRIOR ART)
FIG. 2 is a circuit diagram showing a sensor element of a current-type sensor array according to the prior art.
Figure 3:
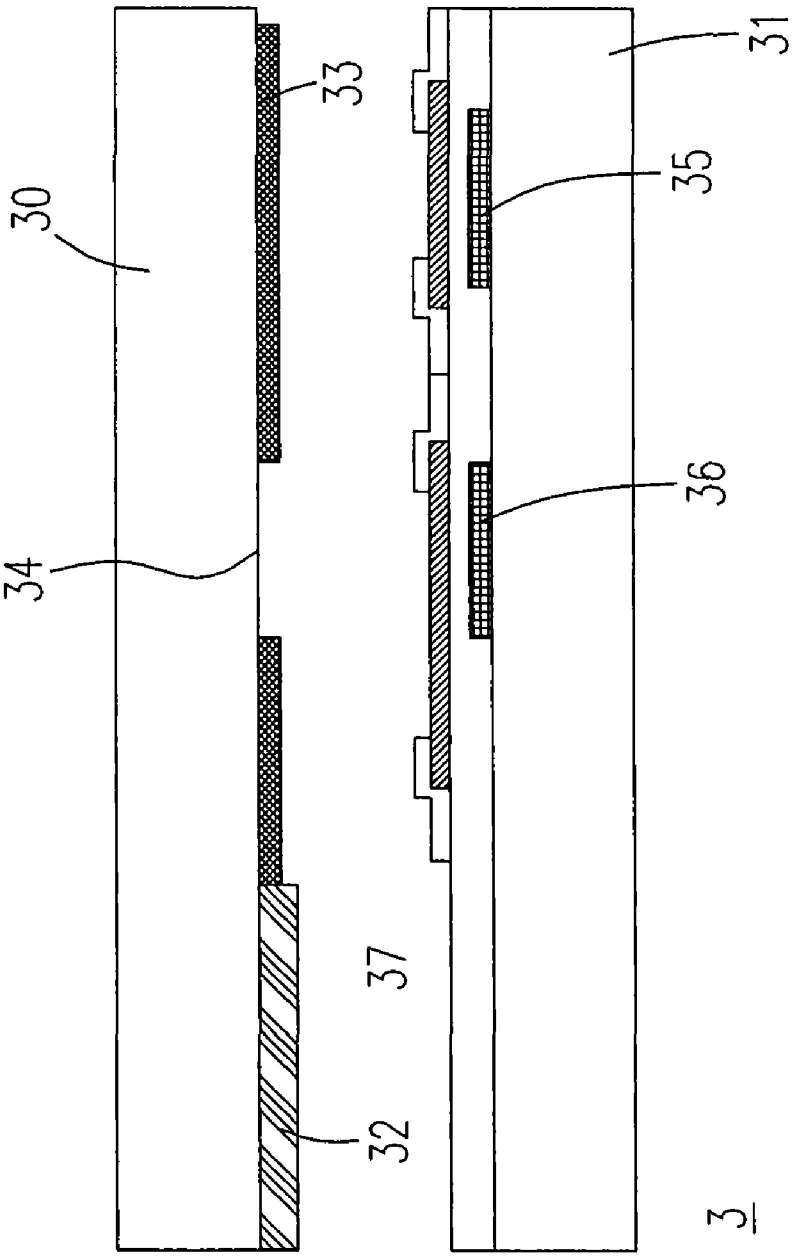
Fig. 3 (PRIOR ART)
FIG. 3 is a cross-sectional view showing a TFT-LCD embedded by sensor elements according to the prior art.
Figure 7A:
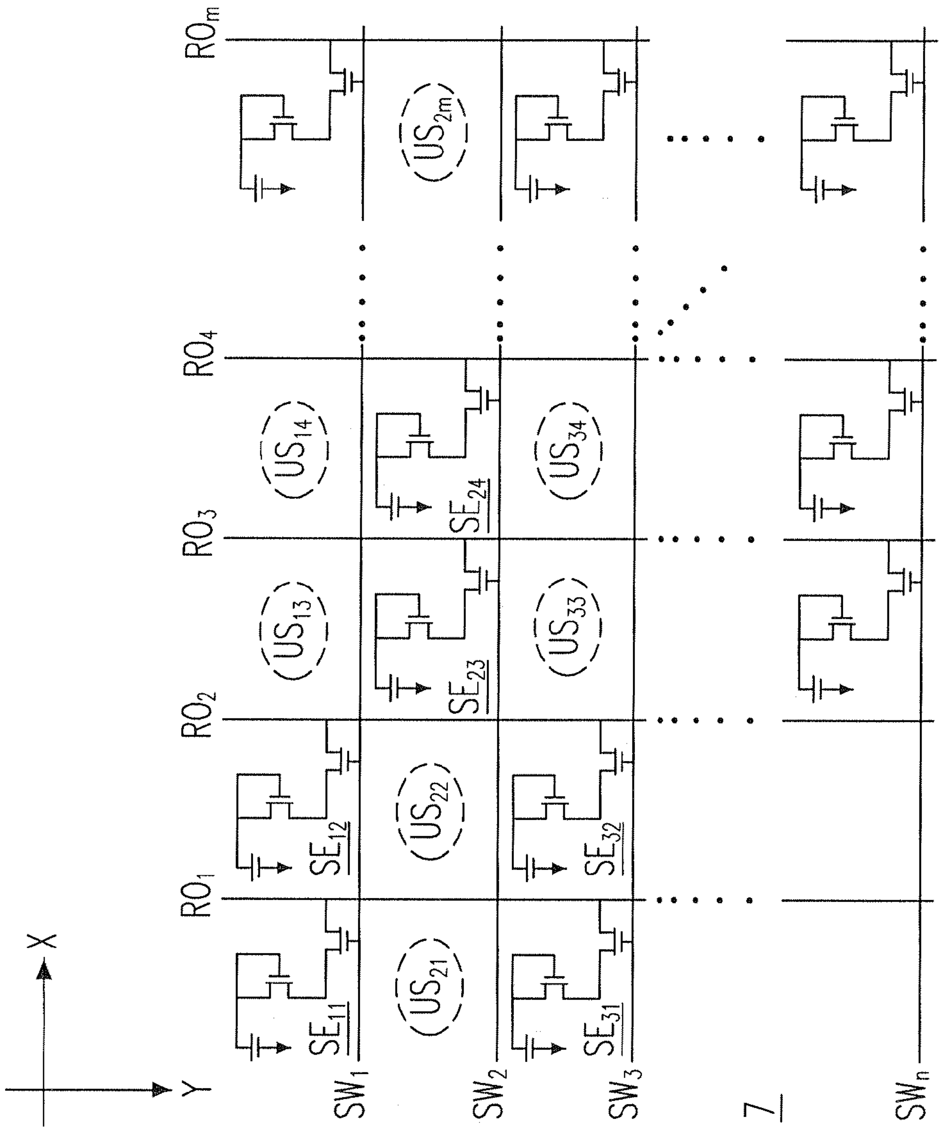
FIG. 7 (A) is a partial circuit diagram showing an image sensor array according to the present invention.
Figure 7B:
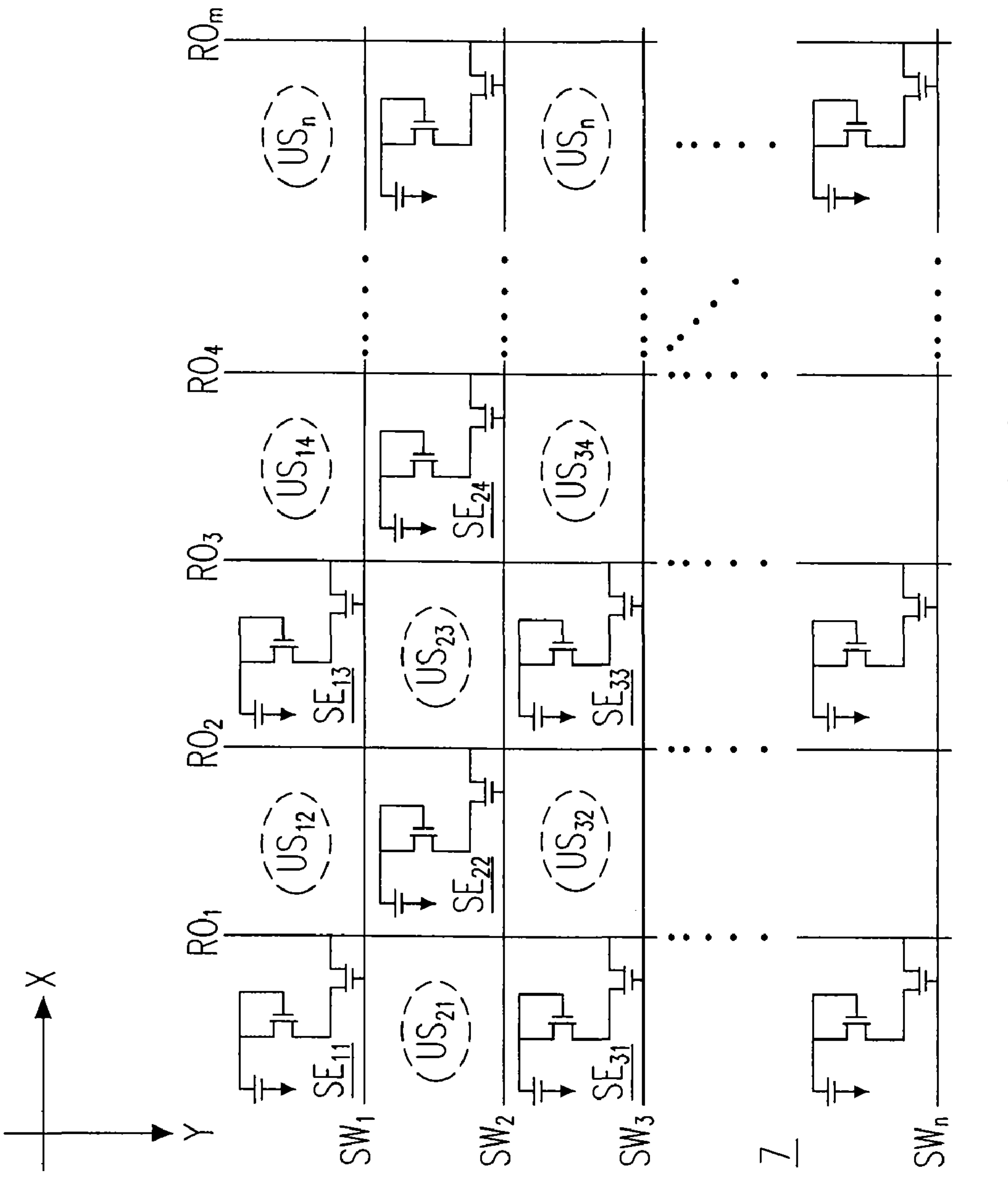

Please refer to FIG. 7 (A), which is a partial circuit diagram showing an image sensor array according to the present invention. As shown, the image sensor array 7 includes m readout lines $RO_{1-m}$, n switch lines $SW_{1-n}$ and a plurality of sensor elements. In this embodiment, the image sensor array 7 comprises the current-type sensor elements as shown in FIG. 2, but it can also be replaced by the charge-type sensor elements as shown in FIG. 1. The m readout lines $RO_{1-m}$ are parallel to one another to read out photocurrents from the sensor elements. The n switch lines $SW_{1-n}$ are parallel to one another and perpendicular to the m readout lines $RO_{1-m}$ so that m×n positions are defined by m×n intersections. For example, the sensor element on the position defined by the readout line $RO_1$ and the switch line $SW_1$ is symbolized by $SE_{11}$.

In this embodiment, the switch line $SW_1$ is connected the corresponded sensor elements $SE_{11}$ and $SE_{12}$, but there are no sensor element arranged on the position defined by the readout lines $RO_{3, 4}$ and the switch line $SW_1$, which are called un-sensing areas $US_{13}$ and $US_{14}$. The position of sensor elements disposed on the switch line $SW_2$ are different from those on the switch line $SW_1$. There are no sensor elements disposed on the position defined by the readout lines $RO_2$ and the switch line $SW_2$, the un-sensing areas $U_{21}$ and $U_{22}$ are arranged on the positions defined by the switch line $SW_2$ and the readout lines $RO_{1-2}$. The switch line $SW_2$ is connected to the sensor elements $SE_{23}$ and $SE_{24}$. Furthermore, the arrangement of the sensor elements of the odd switch lines is the same as that of the switch line $SW_1$, and the arrangement of the sensor elements of the even switch lines is the same as that of the switch line $SW_2$.

As shown in FIG. 7 (B), which is a partial circuit diagram showing an image sensor array according to the present invention. As shown, the image sensor array 7 includes m readout lines $RO_{1-m}$, n switch lines $SW_{1-n}$ and a plurality of sensor elements. The m readout lines $RO_{1-m}$ are parallel to one another to read out photocurrents from the sensor elements. The n switch lines $SW_{1-n}$ are parallel to one another and perpendicular to the m readout lines $RO_{1-m}$ so that m×n positions are defined by m×n intersections. For example, the sensor element on the position defined by the readout line $RO_1$ and the switch line $SW_1$ is symbolized by $SE_{11}$.

Figure 8:
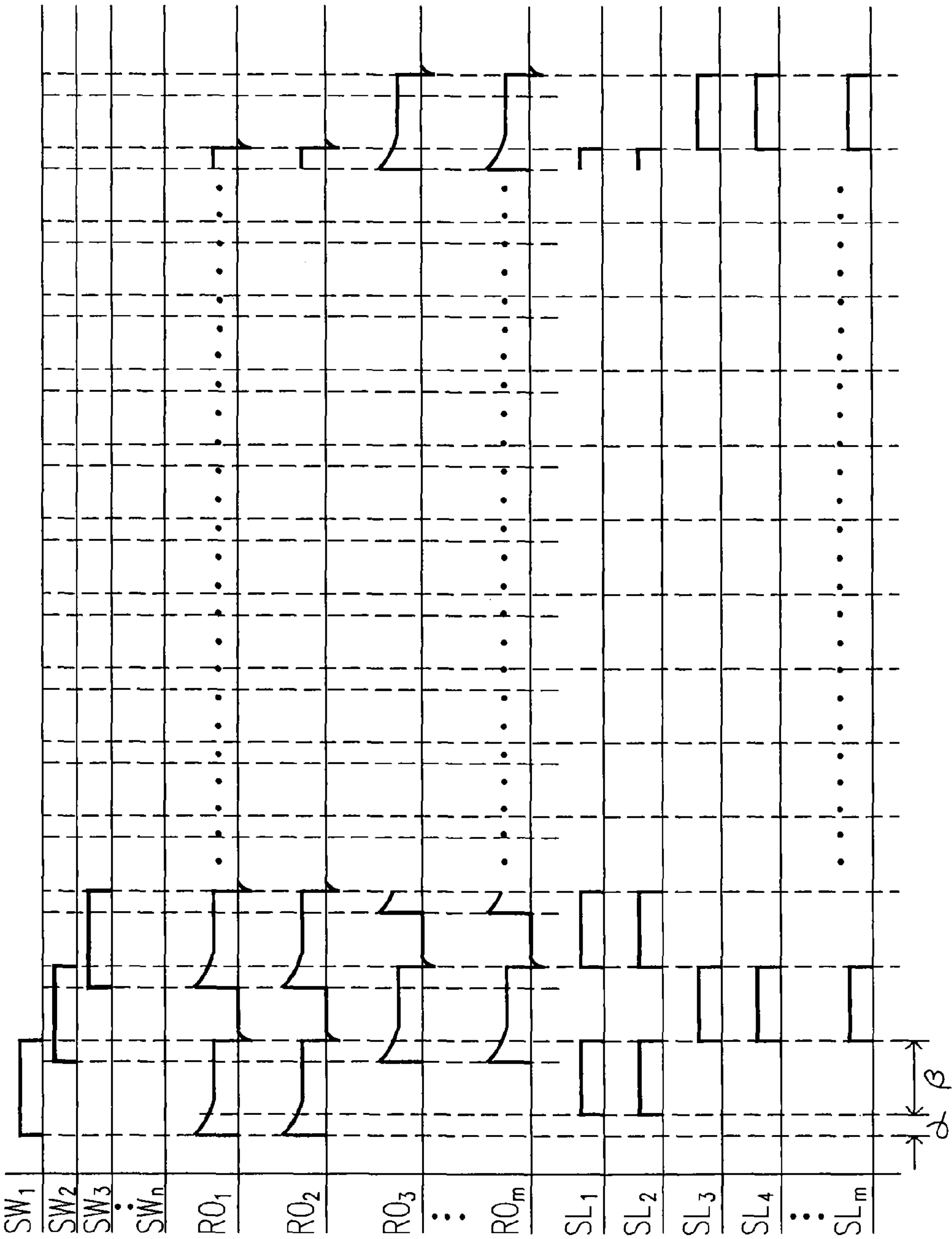
FIG. 8 is a timing diagram showing the operation of the image sensor array in FIG. 7 (A)

In this embodiment, the switch line $SW_1$ is connected the corresponded sensor elements $SE_{11}$ and $SE_{13}$, but there are no sensor element arranged on the position defined by the readout lines $RO_{2, 4}$ and the switch line $SW_1$, which are called un-sensing areas $US_{12}$ and $US_{14}$. The position of sensor elements disposed on the switch line $SW_2$ are different from those on the switch line $SW_1$. There are no sensor elements disposed on the position defined by the readout lines $RO_{1, 3}$ and the switch line $SW_2$, the un-sensing areas $U_{21}$ and $U_{23}$ are arranged on the positions defined by the switch line $SW_2$ and the readout lines $RO_{1, 3}$. The switch line $SW_2$ is connected to the sensor elements $SE_{22}$ and $SE_{24}$. Furthermore, the arrangement of the sensor elements of the odd switch lines is the same as that of the switch line $SW_1$, and the arrangement of the sensor elements of the even switch lines is the same as that of the switch line $SW_2$ To eliminate the drawback of the prior art by increasing the readout time of the image sensor array, a driving method of the signals of the switch lines is provided in the present invention. That is, the signals of the switch lines in several chosen switch lines are overlapped, so that the readout time is increased. The number of the chosen switch lines depends on demands. In the embodiment as shown in FIG. 7 (A) or FIG. 7 (B), the driving method corresponding to FIG. 7 (A) or FIG. 7 (B) is shown in FIG. 8. However, the circuit configuration of the image sensor array needs not be limited to the present embodiment.

According to the driving method of the present invention, the arrangement principle of the sensor elements is described as follows. If there are p switch signals overlapped with each other, there will be only one switch element disposed on one position of the p positions defined by the p corresponded switch lines and one of the readout lines. The numbers of the readout lines and the switch lines are m and n, which are both integrals greater than 1. It is noticed that the integral number p should equal or greater than 2 and less than the number n of the switch lines.

Figure 4:
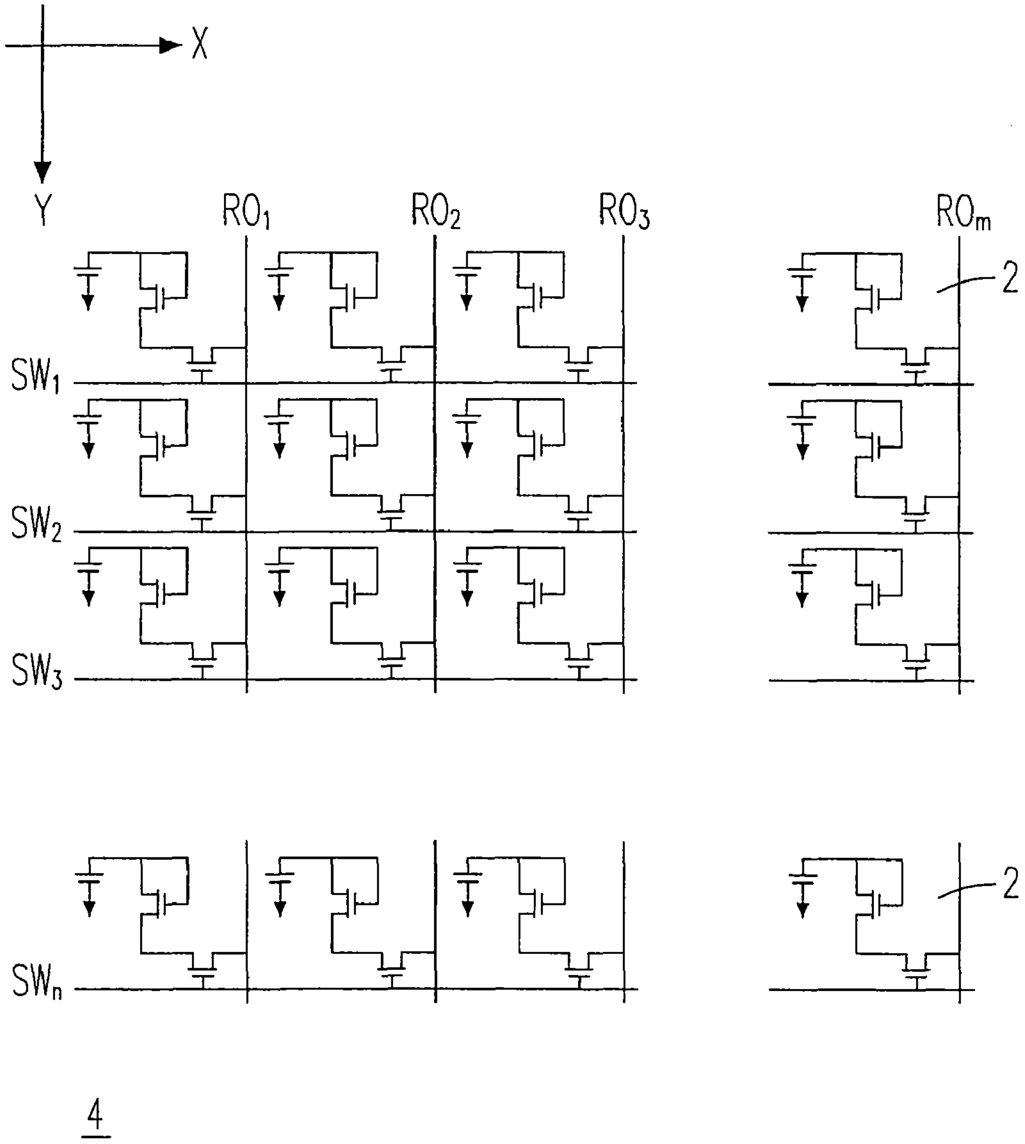
Fig. 4 (PRIOR ART)
FIG. 4 is a partial circuit diagram showing a current-type sensor array according to the prior art.
Figure 5:
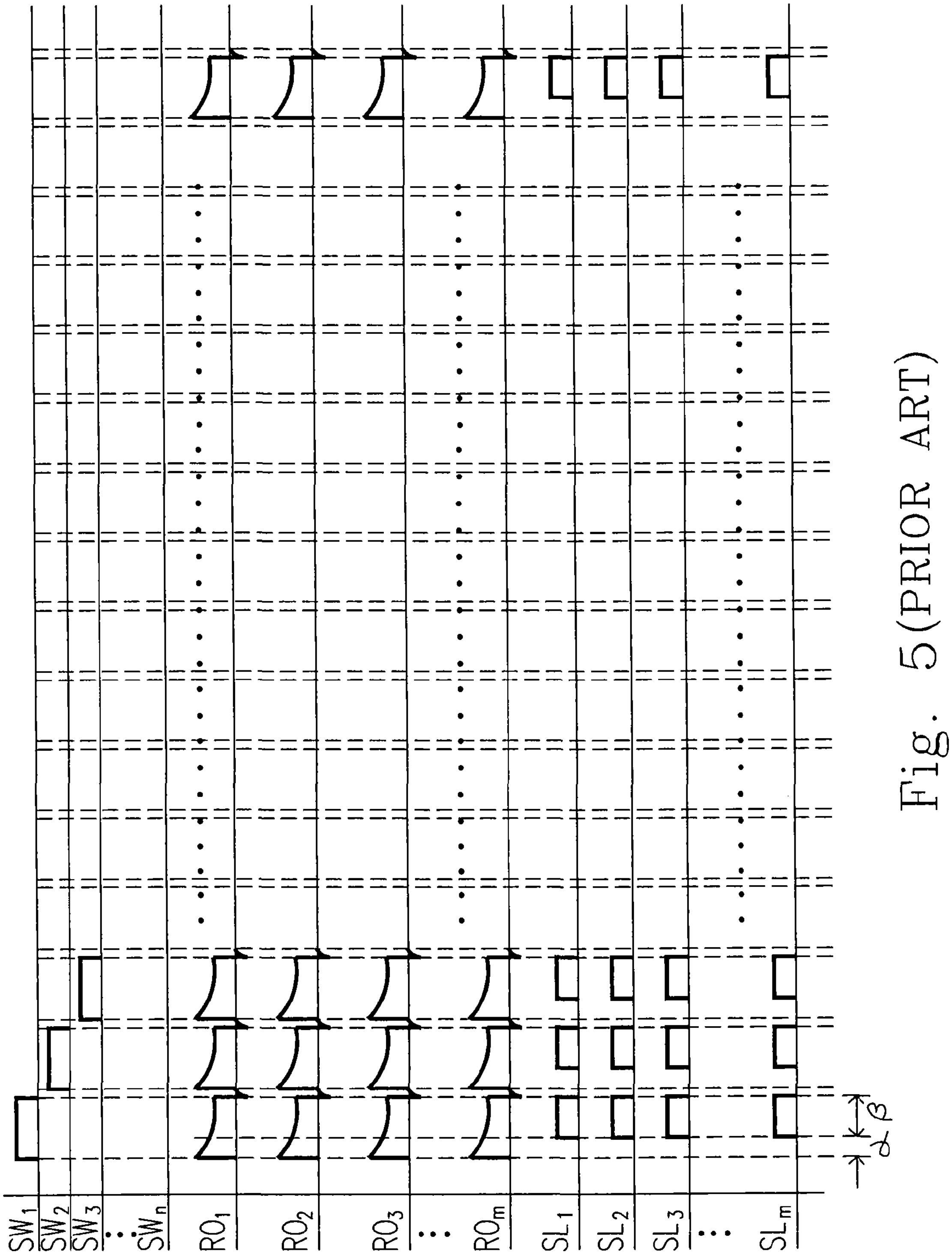
Fig. 5(PRIOR ART)
FIG. 5 is a timing diagram showing the operation of the sensor array in FIG. 4.
Figure 6:
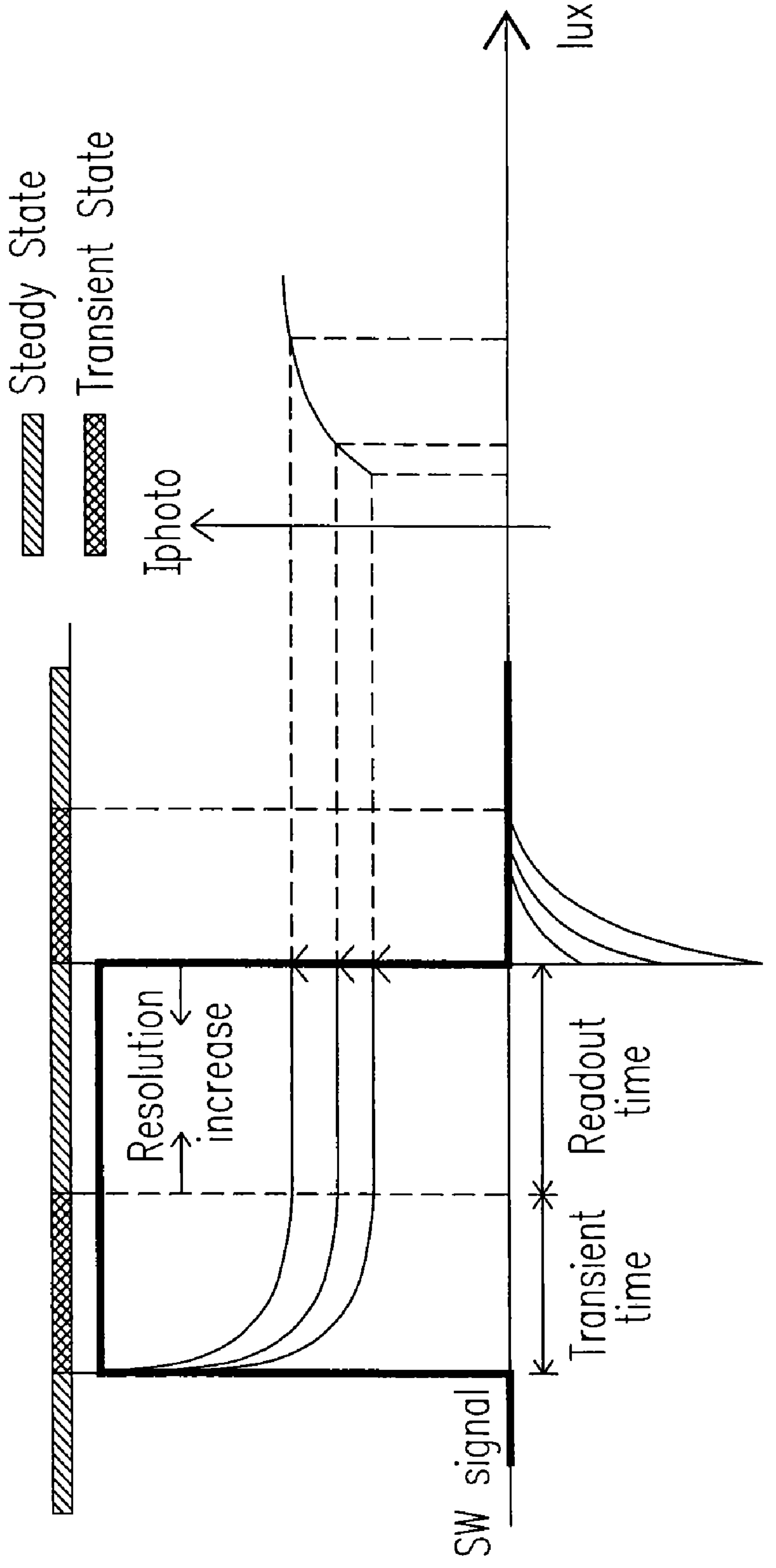
Fig. 6 (PRIOR ART)
FIG. 6 is a timing diagram showing the variation of different photocurrent signals of FIG. 5.

As shown in FIG. 8, the signals of the switch lines on the switch line $SW_1$ and $SW_2$ are overlapped, p equal to two, so there is only one sensor element $SE_{11}$ disposed on one of the two positions defined by the switch lines $SW_{1-2}$ and the readout line $RO_1$. That is to say, compared to the image sensor array of the prior art shown in FIG. 4, for example, the sensor elements $SE_{11}$ and $SE_{12}$ are arranged but the sensor elements $SE_{21}$ and $SE_{22}$ are removed. The first two sensor elements of the switch line $SW_2$ are $SE_{23}$ and $SE_{24}$ which are on the positions defined by the switch line $SW_2$ and the readout lines $RO_{3-4}$. On the other hand, the first two sensor elements of the switch line $SW_3$ are $SE_{31}$ and $SE_{32}$ which are on the positions defined by the switch line $SW_3$ and the readout lines $RO_{1-2}$ caused that switch line signals of the switch line $SW_1$ and $SW_3$ are not overlapped.

By this arrangement principle, the image sensor array 7 of the present invention is arranged as FIG. 7 (A) or FIG. 7 (B) and the readout time can be substantially increased. Please refer to FIG. 8, which is a timing diagram showing the operation of the image sensor array in FIG. 7 (A). As shown, a photocurrent shows on the readout line $RO_1$ when the switch line $SW_1$ is turned on and the selection signal $SL_1$ is turn on, too. For the signals of the switch lines $SW_1$ and $SW_2$ are overlapped, the selection signals $SL_1$ and $SL_2$ naturally have the same period. Similarly, the selection signals $SL_3$ and the $SL_4$ have the same period. Since the switch signal $SW_1$ overlaps the switch signal $SW_2$, the turn on time of the photosensing device is increased. That is the readout time symbolized by β can be increased.

Specifically, a sudden high photocurrent signal appears in a very short period when the switch line $SW_1$ is turned on. This period is called a transient time which is symbolized by α in the bottom of FIG. 8. In the transient time α, the needless photocurrent is not readout by the system. After the transient time α, the photocurrent in a steady state will be read out by the system. This period of the steady state is symbolized by β in FIG. 8.

Figure 9:
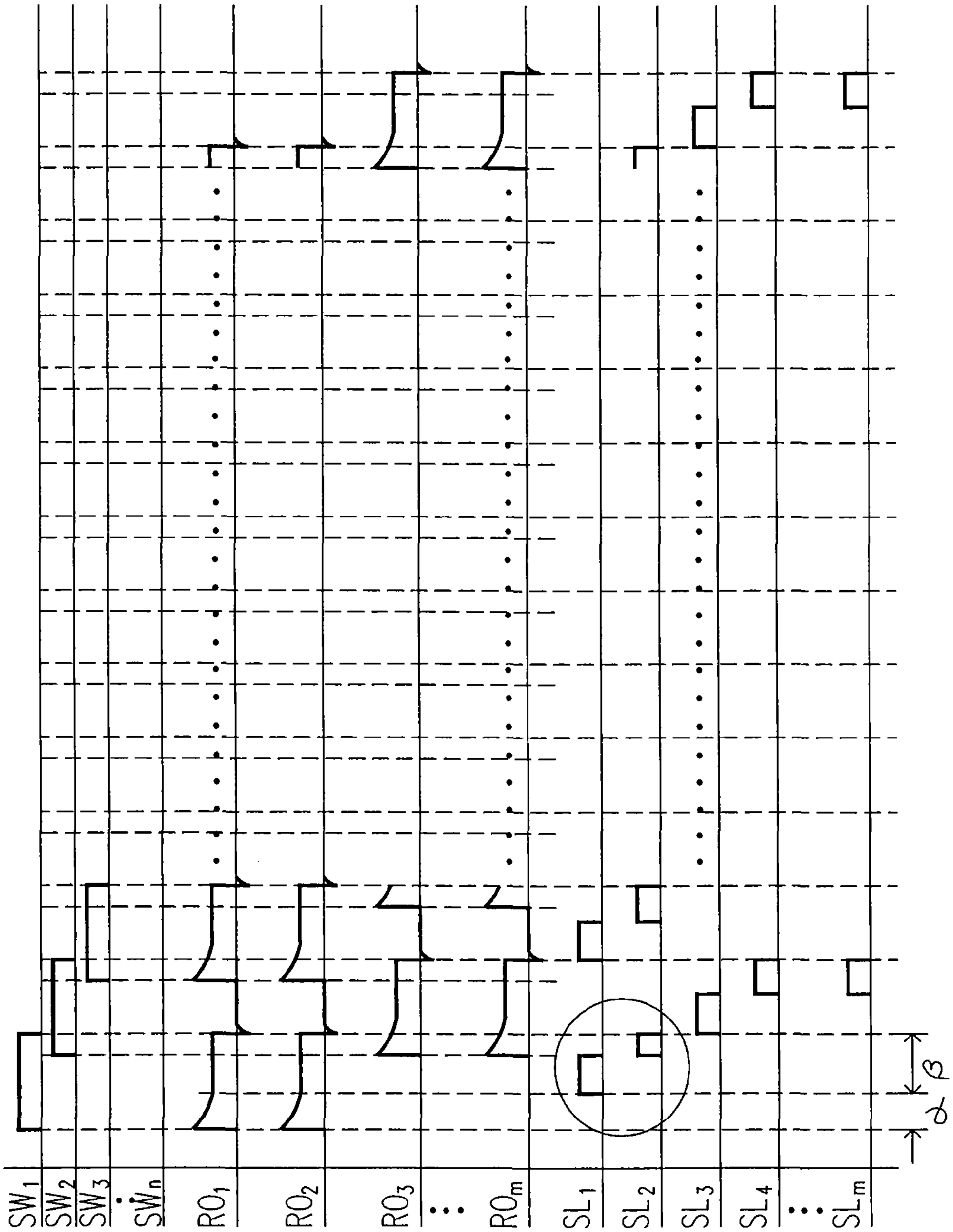
FIG. 9 is a timing diagram showing the time divisional operation of the image sensor array in FIG. 7 (A)

For the limited capability of the system to cope with a plurality of the readout line signals at a time, a time division method can be incorporated here to improve the resolution of the image sensor array. Please refer to FIG. 9, which is a timing diagram showing the time divisional operation of the image sensor array in FIG. 7 (A) or FIG. 7 (B). As shown, the selection signals $SL_1$ and $SL_2$ show in turn in the readout time β. So the photocurrents is read out by the readout line $RO_1$ and then read out by the readout line $RO_2$. The time divisional method can be arranged by the incorporation of a multiplexer. With this method, the number of the photocurrents has to be coped with in the same period is reduced to a half. This embodiment also increases the readout time via overlapping the switch signals, and makes the system have sufficient time to cope with the photocurrent.

Figure 10A:
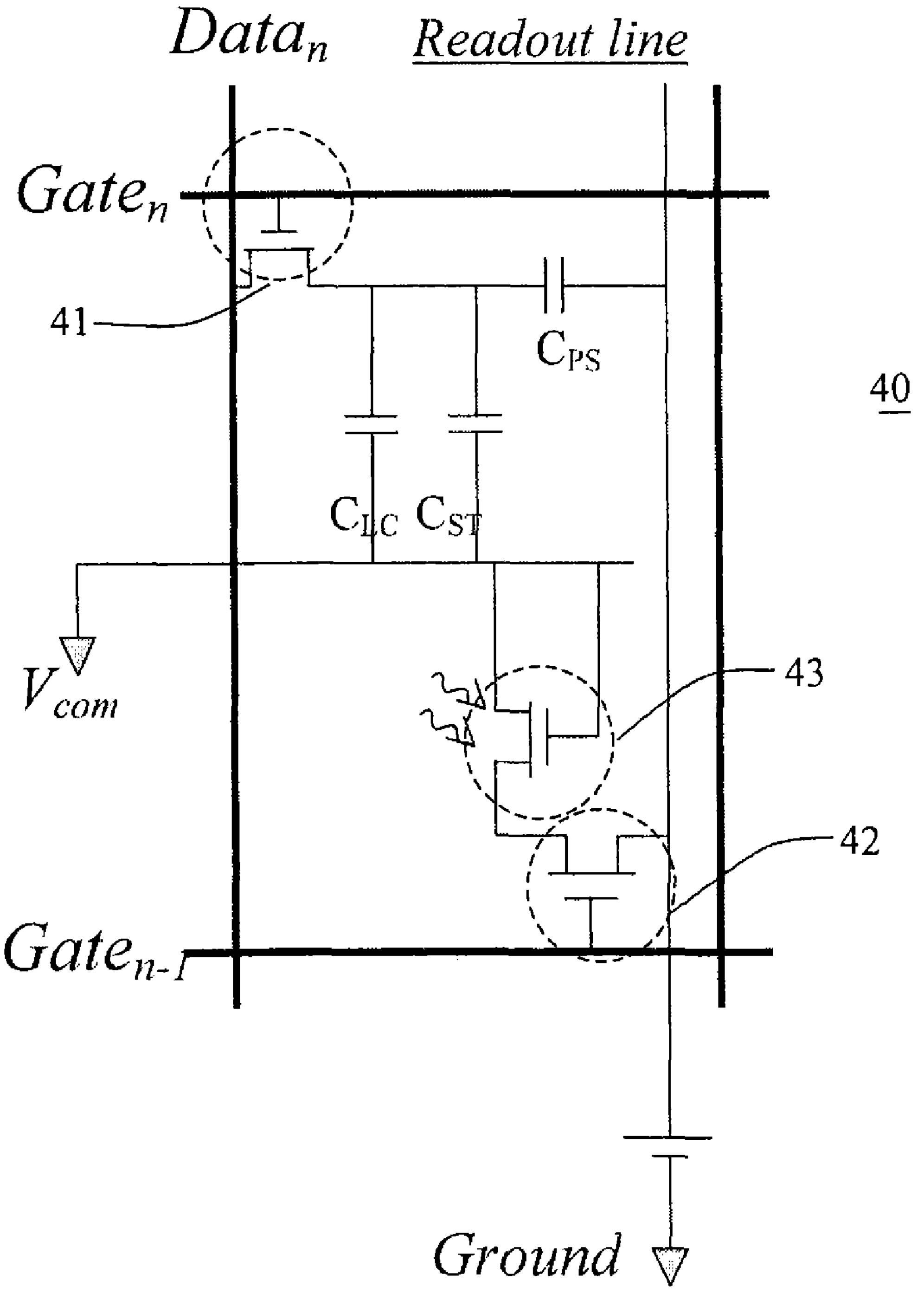
FIG. 10 (A) is a partial circuit diagram showing a readout pixel of a TFT-LCD with the image sensor array technology according to the present invention.
Figure 10B:
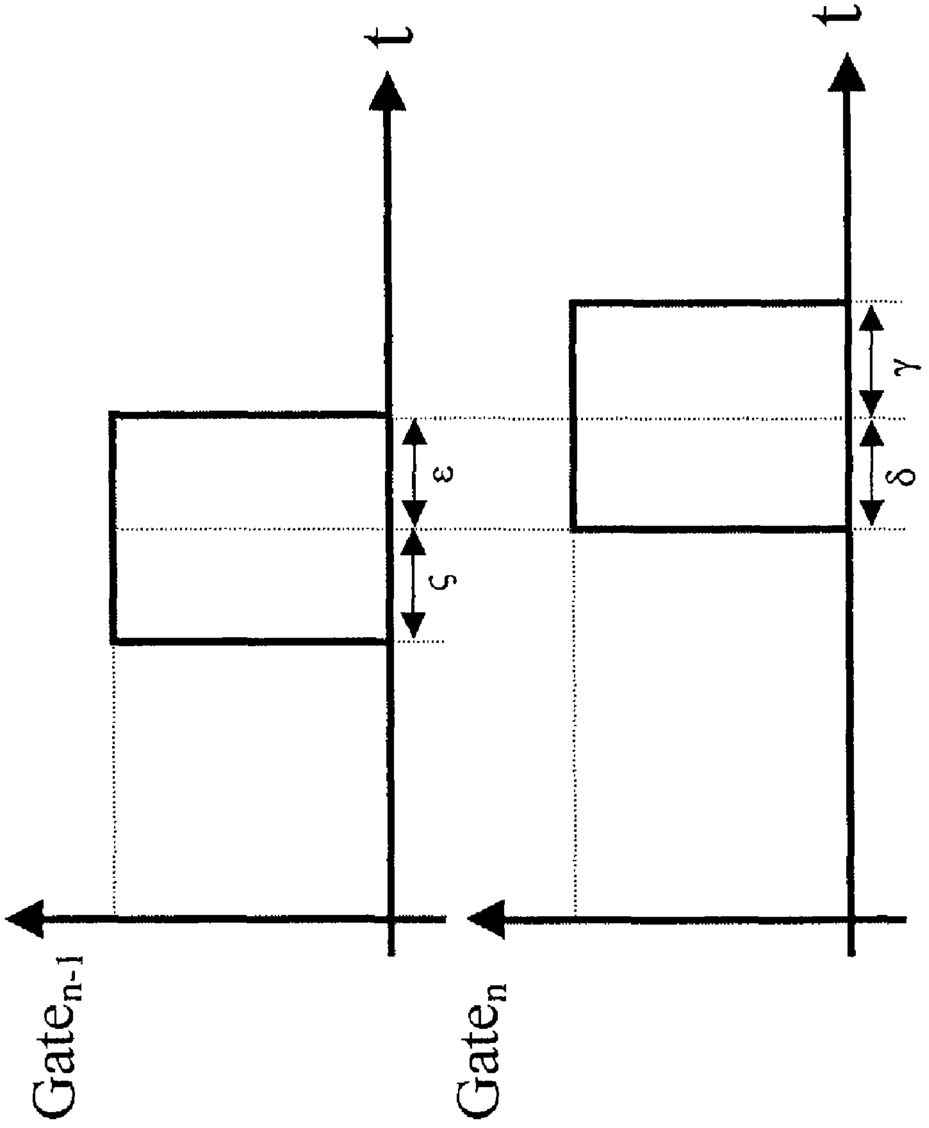

The image sensor array of the present invention can also be embedded in a TFT-LCD to form an input display. Please refer to FIG. 10 (A), which is a partial circuit diagram showing a readout pixel of a TFT-LCD with the image sensor array technology according to the present invention. As shown, the readout pixel 40 includes a pixel switch device 41 and a sensor element comprising a readout switch device 42 and a photosensing device 43.

Compared with the embodiment of FIG. 7 (A) or FIG. 7 (B), this embodiment further comprises the pixel switch device 41. The arrangement principle of the readout pixels is the same as that of the sensor elements which has been described above and will be omitted here. For this embodiment, the switch line of the sensor element is replaced by the original gate line of the TFT-LCD. The additional procedure is to fabricate the readout line which does not exist in the conventional TFT-LCD. The bias voltage of the sensor element is replaced by the common line of the TFT-LCD. The signal of the switch line is replaced by the gate signal of the TFT-LCD. By the way, the combination of the present invention with a TFT-LCD is effortless and an addition process is needless since the process of the image sensor array is compatible with a TFT-LCD.

The original function of the gate signal in the TFT-LCD is controlling the process of the gray level voltage being written in the TFT. In other words, the switch signal is not only used to control the switching of the photocurrent as the other embodiment mentioned above, but also played as the gate signal. Please refer to FIG. 10 (B), which is a partial waveform diagram showing a gate signal of the readout pixel with the image sensor array technology according to the present invention. As shown, the present gate signal $Gate_n$ is extended to overlap the former one $Gate_{n-1}$. There are two parts of the gate signal $Gate_n$ and $Gate_{n-1}$ of the present invention separately. The first part γ of the gate signal $Gate_n$ is the original gate signal for writing the current gray level voltage of the $n^{th}$ gate line and the second part 6 prior to the first part γ is the extended gate signal of the $n^{th}$ gate line overlapped with the first part ϵ of the gate signal $Gate_{n-1}$. Similarly, the first part ϵ of the gate signal $Gate_{n-1}$ is used for writing the current gray level voltage of the $n-1^{th}$ gate line, and the second part ζ prior to the first part ϵ is the extended gate signal of the $n-1^{th}$ gate line. Properly, the second part δ of the gate signal $Gate_n$ is equal to the first part ϵ of the gate signal $Gate_{n-1}$. Because the overlapped part is the extended gate signal of the $n^{th}$ gate line, the gray level voltage can still be written correctly and the display quality will not be affected.

In conclusion, an image sensor array and the driving method thereof are provided. With the special circuit configuration of the image sensor array, the readout time of the photosensing device can be increased effectively and the influence of the transient time can be avoided. The image sensor array can also be embedded in the TFT-LCD to form an input display with an excellent resolution and a perfect display quality.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image sensor array comprising:

a substrate;

a readout line disposed on the substrate;

a first switch line and a second switch line both intersecting the readout line;

a first position defined by the readout line and the first switch line;

a second position defined by the readout line and the second switch line; and a sensor element disposed only on the first position;

wherein the first switch line transmitting a first switch signal and the second switch line transmitting a second switch signal overlapped the first switch signal.

2. The image sensor array as claimed in claim 1, wherein the sensor element comprises a readout switch device and a photosensing device connecting to a bias voltage.

3. The image sensor array as claimed in claim 2, wherein the readout switch device comprises a first gate electrode, a first drain electrode, and a first source electrode.

4. The image sensor array as claimed in claim 3, wherein the first gate electrode connects to the first switch line.

5. The image sensor array as claimed in claim 4, wherein the first drain electrode connects to the readout line, and the first source electrode connects to the photosensing device and a storage capacitor connecting to the bias voltage.

6. The image sensor array as claimed in claim 4, wherein the first drain electrode connects to photosensing device, and the first source electrode connects to the readout line.

7. The image sensor array as claimed in claim 2, wherein the photosensing device comprises a second gate electrode, a second drain electrode, and a second source electrode.

8. The image sensor array as claimed in claim 7, wherein the second gate electrode connects to a storage capacitor and the bias voltage, the second drain electrode connects to the readout switch device and the storage capacitor, and the second source electrode connects to the storage capacitor and the bias voltage.

9. The image sensor array as claimed in claim 7, wherein the second gate electrode connects to the bias voltage, the second drain electrode connects to the bias voltage, and the second source electrode connects to the readout switch device.

10. A liquid crystal display, comprising:

a first substrate and a second substrate;

a liquid crystal layer interlaid between the first substrate and the second substrate;

a readout line and a data line both disposed on the first substrate;

a first switch line and a second switch line both intersecting the readout line and the data line;

a first position defined by the readout line and the first switch line;

a second position defined by the readout line and the second switch line; and a sensor element disposed only on the first position;

wherein the first switch line transmitting a first switch signal and the second switch line transmitting a second switch signal overlapped the first switch signal.

11. The liquid crystal display as claimed in claim 10, wherein the sensor element comprises a readout switch device, a photosensing device, and a pixel switch device.

12. The liquid crystal display as claimed in claim 11, wherein the readout switch device comprises a first gate electrode, a first drain electrode, and a first source electrode.

13. The liquid crystal display as claimed in claim 12, wherein the first gate electrode connects to the first switch line.

14. The liquid crystal display as claimed in claim 13, wherein the first drain electrode connects to the readout line, and the first source electrode connects to the photosensing device and a storage capacitor connecting to the bias voltage.

15. The liquid crystal display as claimed in claim 13, wherein the first drain electrode connects to photosensing device, and the first source electrode connects to the readout line.

16. The liquid crystal display as claimed in claim 11, wherein the photosensing device comprises a second gate electrode, a second drain electrode, and a second source electrode.

17. The liquid crystal display as claimed in claim 16, wherein the second gate electrode connects to a storage capacitor and the bias voltage, the second drain electrode connects to the readout switch device and the storage capacitor, and the second source electrode connects to the storage capacitor and the bias voltage.

18. The liquid crystal display as claimed in claim 16, wherein the second gate electrode connects to the bias voltage, the second drain electrode connects to the bias voltage, and the second source electrode connects to the readout switch device.

19. The liquid crystal display as claimed in claim 11, wherein the pixel switch device comprises a third gate electrode connecting to one of the first switch line and the second switch line, a third drain electrode connects to a liquid capacitor and a storage capacitor, and a third source electrode connects to the data line.

20. The liquid crystal display as claimed in claim 19, wherein the liquid capacitor and the storage capacitor both connect to a common voltage.

* * * * *

UNITED STATES PATENT AND TRADEMARK OFFICE

CERTIFICATE OF CORRECTION

PATENT NO. : 7,623,112 B2
APPLICATION NO. : 11/424025
DATED : November 24, 2009
INVENTOR(S) : Po-Yang Chen et al.

It is certified that error appears in the above-identified patent and that said Letters Patent is hereby corrected as shown below:

On the title page, item (75), correct the name of the first inventor from "Po-Yeng Chen" to "Po-Yang Chen"

Signed and Sealed this

Thirteenth Day of April, 2010

David J. Kappos

*Director of the United States Patent and Trademark Office*